(12) United States Patent
Shang et al.

(10) Patent No.: US 12,467,830 B2
(45) Date of Patent: Nov. 11, 2025

(54) SAMPLING DEVICE AND DETECTION BOX

(71) Applicant: LEADWAY (HK) LIMITED, Sheung Wan (CN)

(72) Inventors: Tao Shang, Zhejiang (CN); Jianliang Ni, Zhejiang (CN); Tenglong Bai, Zhejiang (CN); Fangfang Tian, Zhejiang (CN); Juan Cui, Zhejiang (CN); Guo Yang, Zhejiang (CN); Linyong Tang, Zhejiang (CN)

(73) Assignee: LEADWAY (HK) LIMITED, Hong Kong (CN)

( * ) Notice: Subject to any disclaimer, the term of this patent is extended or adjusted under 35 U.S.C. 154(b) by 783 days.

(21) Appl. No.: 17/631,729

(22) PCT Filed: Jul. 31, 2020

(86) PCT No.: PCT/CN2020/106388
§ 371 (c)(1),
(2) Date: Jan. 31, 2022

(87) PCT Pub. No.: WO2021/018300
PCT Pub. Date: Feb. 4, 2021

(65) Prior Publication Data
US 2022/0276132 A1 Sep. 1, 2022

(30) Foreign Application Priority Data
Aug. 1, 2019 (CN) .......................... 201910706447.3

(51) Int. Cl.
*G01N 1/14* (2006.01)
*B01L 3/00* (2006.01)

(52) U.S. Cl.
CPC ................ *G01N 1/14* (2013.01); *B01L 3/502* (2013.01); *B01L 2200/026* (2013.01);
(Continued)

(58) Field of Classification Search
CPC .... G01N 1/14; G01N 2001/149; B01L 3/502; B01L 2200/026; B01L 2200/0605;
(Continued)

(56) References Cited

U.S. PATENT DOCUMENTS

| 5,833,630 A | 11/1998 | Kloth | |
|---|---|---|---|
| 2009/0209882 A1* | 8/2009 | Saunders | ......... A61B 5/150755 |
| | | | 600/573 |

(Continued)

FOREIGN PATENT DOCUMENTS

| CN | 101291620 A | 10/2008 |
|---|---|---|
| CN | 202204706 U | 4/2012 |

(Continued)

OTHER PUBLICATIONS

International Search Report and Written Opinion issued in PCT/CN2020/106388 dated Oct. 29, 2020—incl Engl lang transl (18 pages total).

(Continued)

*Primary Examiner* — Jill A Warden
*Assistant Examiner* — Alex Ramirez
(74) *Attorney, Agent, or Firm* — Michael A. Whittaker

(57) ABSTRACT

A sampling device comprises a handle and a collector. The collector is connected to the handle. The collector has a capillary function and is able to automatically suction a liquid reagent or sample. The sampling device is able to suction a required amount of the reagent or sample quickly, conveniently and quantitatively. The sampling device can be product conveniently, and may achieve micro-quantitative sampling. The reagent is stored in the collector of the sampling device in the form of a dry powder, which may achieve the individual packaging of the detection reagent.

11 Claims, 11 Drawing Sheets

(52) U.S. Cl.
CPC ... *B01L 2200/0605* (2013.01); *B01L 2200/16* (2013.01); *B01L 2300/0609* (2013.01); *B01L 2300/0838* (2013.01); *B01L 2400/0406* (2013.01); *G01N 2001/149* (2013.01)

(58) Field of Classification Search
CPC ......... B01L 2200/16; B01L 2300/0609; B01L 2300/0838; B01L 2400/0406
See application file for complete search history.

(56) References Cited

U.S. PATENT DOCUMENTS

| | | | |
|---|---|---|---|
| 2014/0127828 A1 | 5/2014 | Hou et al. | |
| 2014/0186235 A1* | 7/2014 | Kwak | B01L 3/021 422/520 |
| 2015/0137005 A1* | 5/2015 | Baaske | G01N 21/13 250/453.11 |
| 2018/0193841 A1 | 7/2018 | Liu et al. | |

FOREIGN PATENT DOCUMENTS

| | | | | |
|---|---|---|---|---|
| CN | 104918703 | A | | 9/2015 |
| CN | 110050069 | A | | 7/2019 |
| CN | 112295628 | A | | 2/2021 |
| CN | 213301769 | U | | 5/2021 |
| EP | 3318876 | A1 | * | 5/2018 ............. B01L 3/523 |
| JP | 2008-011880 | A2 | | 1/2008 |
| WO | 03066667 | A2 | | 8/2003 |
| WO | WO2013010333 | A1 | | 1/2013 |
| WO | WO2020013970 | A1 | | 1/2020 |

OTHER PUBLICATIONS

International Preliminary Report on Patentability issued in PCT/CN2020/106388 dated Feb. 1, 2022—incl Engl lang transl (12 pages total).

First Office Action issued by SIPO in Chinese Patent Application No. 202010368575.4 dated Sep. 28, 2021—incl Engl lang transl (9 pages total).

Response to First Office Action issued in Chinese Patent Application No. 202010368575.4 dated Feb. 9, 2022—incl Engl lang transl only (5 pages total).

Second Office Action issued by SIPO in Chinese Patent Application No. 202010368575.4 dated Apr. 25, 2022—incl Engl lang transl (12 pages total).

First Office Action issued by SIPO in Chinese Patent Application No. 202020709096.X dated Dec. 1, 2020—incl Engl lang transl only (2 pages total).

Response to First Office Action issued in Chinese Patent Application No. 202020709096.X dated Feb. 11, 2021—incl Engl lang transl (2 pages total).

Extended European Search Report issued in EP 20845993 dated Jul. 5, 2023 (7 pages).

* cited by examiner

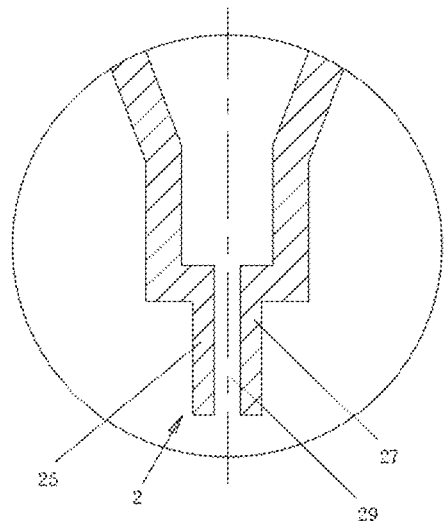
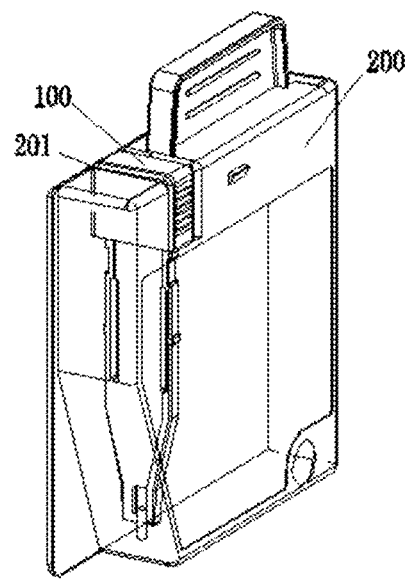
Fig.8B
Fig. 9
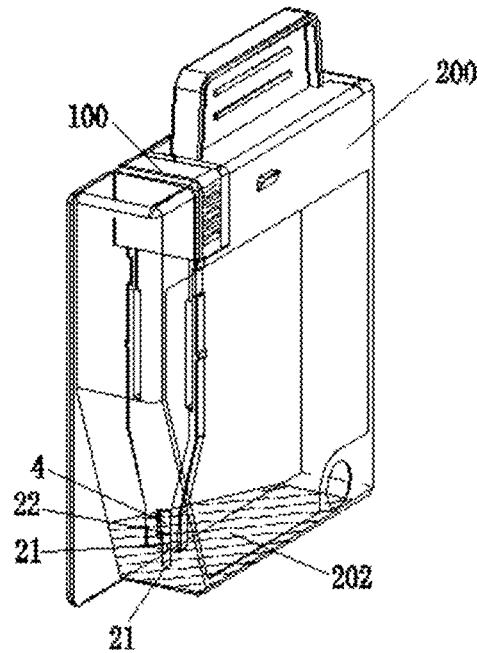
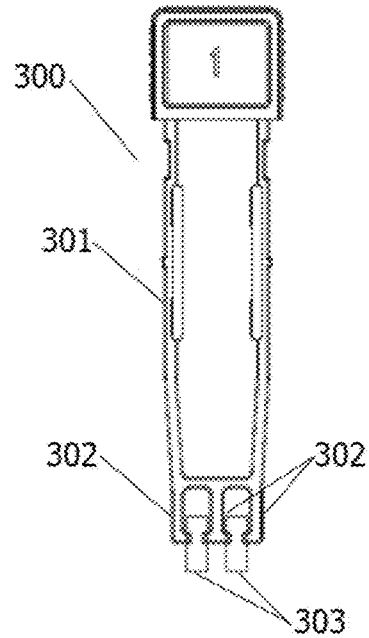
Fig. 10
Fig.11

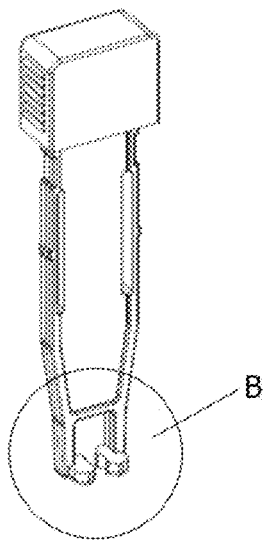
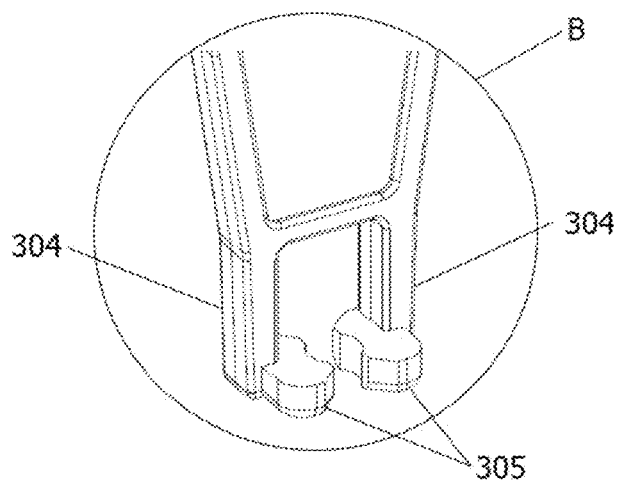
Fig.12A     Fig.12B
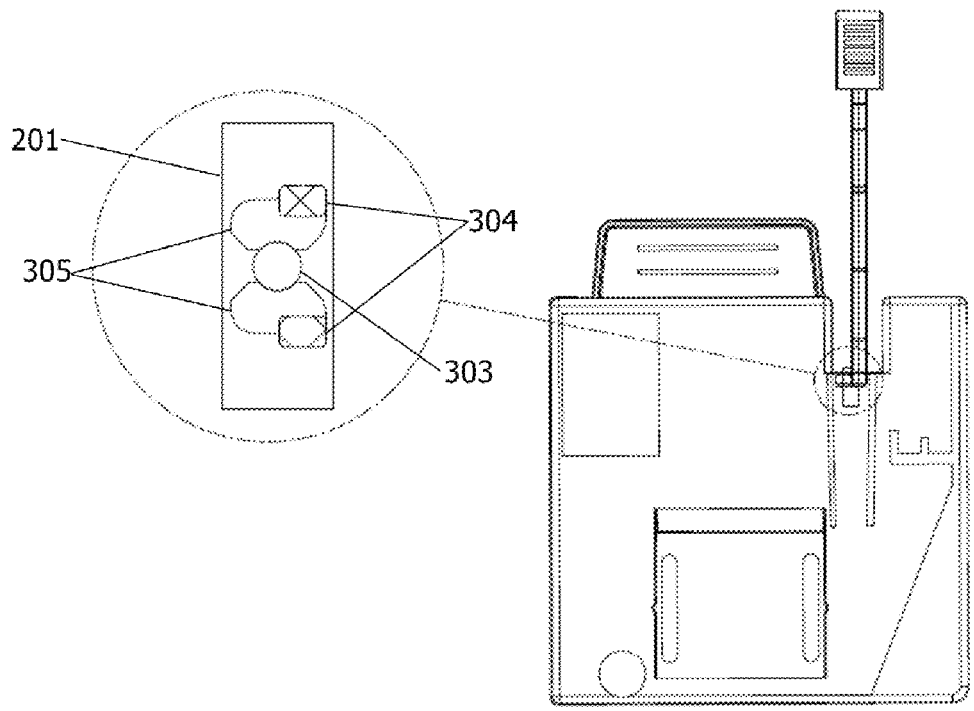
Fig.13

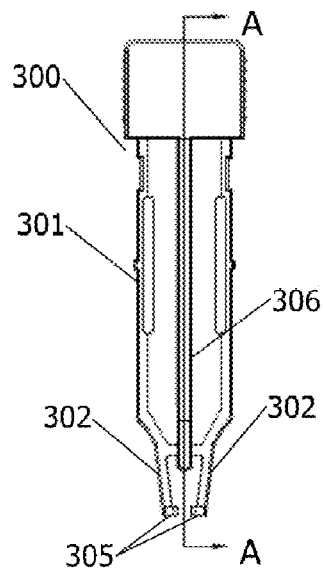
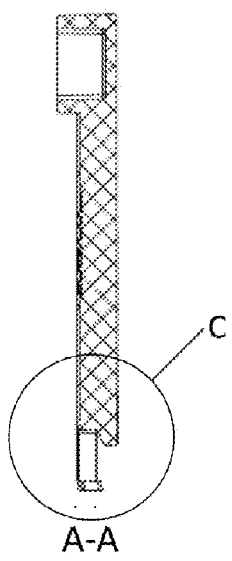
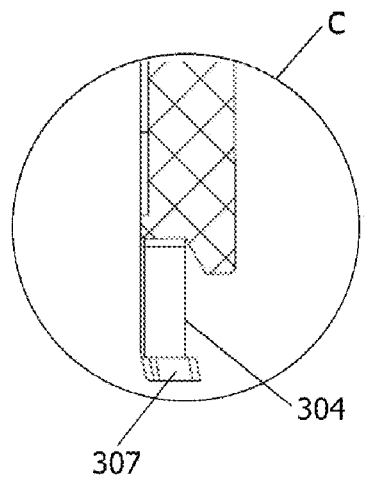
Fig.14A   Fig.14B   Fig.14C
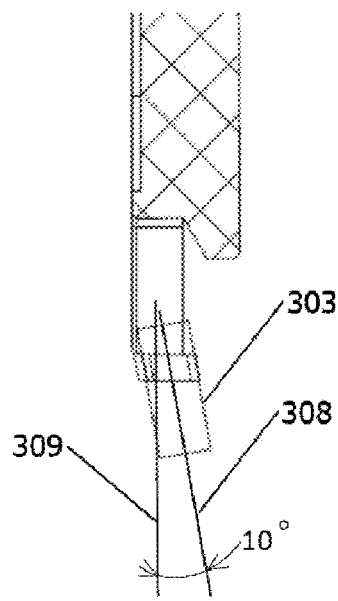
Fig.15

SAMPLING DEVICE AND DETECTION BOX

CROSS-REFERENCE TO RELATED MATTERS

The present invention is filed under 35 U.S.C. § 371 as the U.S. national phase of International Patent Application No. PCT/CN2020/106388, filed Jul. 31, 2020, which designated the United States and claims priority to Chinese Patent Application No. 201910706447.3, filed Aug. 1, 2019, each of which is hereby incorporated in its entirety including all tables, figures and claims.

TECHNICAL FIELD

The present invention relates to a device for sampling and preserve sample, in particular to a sampling device and a test vessel for mated use.

BACKGROUND OF THE INVENTION

Medical in vitro diagnosis plays a very important role in the current medical industry. It provides reference data for disease diagnosis, treatment indicators or physical health condition or the like by qualitatively or quantitatively measuring the changes of various biological indicators in a human body. For example, the reaction vessel stated in U.S. Pat. No. 5,162,237 is used to complete test of the analyte in blood to assess the physical condition of a tester over a period of time.

During the use of test equipment, according to the need of test or the design requirements of the instrument itself, before each test or after use for a period of time, it is necessary to regularly use a quality control solution or calibration solution to perform performance test on the test equipment. Thus, the test equipment is calibrated, or it is confirmed whether the performance of the test equipment still conforms to the requirements specified by the instrument after use for a period of time.

At present, controls provided by instrument manufacturers to users are often in the form of multiple-serving package. When a user uses controls to assess the performance of a test instrument, it needs to repack the controls provided by the manufacturer according to the dosage for single use. Several forms of multiple-serving package are as follows: bottled freeze-dried powder and bottled liquid. However, they all have certain shortcomings. For example, when controls with the usage amount for multiple servings is provided in the form of bottled freeze-dried powder, it needs to be used after redissolving, resulting in large difference between each operation, complicated operation process, and shortened warranty time of the controls after bottle opening. If the controls is not used up within the expiry time after bottle opening, it will cause waste of the controls. When controls with the usage amount for multiple servings is provided in the form of bottled liquid, its period of validity is short. If it is not used up within self life after bottle opening, reagent waste will also be caused. In addition, when controls or calibrator stored in the forms of bottled freeze-dried powder and bottled liquid is used, an additional sampling device (for example pipette) also needs to be used to absorb a certain amount of the controls or calibrator, which increases operation steps; and there may be deviations in each operation, which may lead to deviations of results.

At present, automatic analyzers have been widely used in medical examination for biochemical test, but most of the POCT products are mostly sampled manually, and the operation is complicated. Any carelessness will result in a deviation of the sampling amount, resulting in an inaccurate result. A few products are equipped with special sampling tools, but they more or less have the problems such as inaccurate sampling, incomplete sample making, and inconvenient operation.

SUMMARY OF THE INVENTION

One of the objectives of the present invention is to provide a sampling device, which includes a handle and a collector connected with the handle, the collector includes a capillary structure in which a capillary channel is disposed.

Further, the collector includes a clamping jaw, and the capillary structure is a capillary tube that is separately manufactured and then fixed to the clamping jaw.

Further, the capillary structure and the handle are integrally manufactured, and said capillary channel is formed inside the capillary structure.

Further, said capillary structure and the handle are manufactured integrally, said capillary structure comprises two oppositely arranged protrusions, a gap is disposed between the two protrusions, the size of the gap is greater than or equal to 0.05 mm and less than or equal to 2.00 mm, and the gap forms said capillary channel.

Further, the inner diameter of the capillary tube is greater than 0.05 mm and less than or equal to 2.26 mm, and the capacity of the capillary tube is greater than or equal to 0.1 µL and less than or equal to 20.0 µL.

Further, the sampling device also includes a clamping member, the clamping member is provided with a clamping arm and said clamping jaw, and the handle is connected with the clamping arm of the clamping member.

Further, the central axis of the capillary structure and the central axis of the clamping arm forms a certain angle, which is greater than or equal to 0° and less than or equal 90°.

Further, including N clamping members for connecting N−1 capillary tubes, and N is greater than or equal to 2 and less than or equal to 10.

Further, a reagent is stored in the capillary channel.

Further, the reagent is stored in the capillary channel in the form of liquid, solid particles, powder or gel.

A second objective of the present invention is to provide a test vessel, which includes a test chamber, a sample addition slot and a sampling device, the sampling device including a handle and a capillary tube connected with the handle.

Further, the sampling device also includes a clamping member, the clamping member is provided with a clamping arm and a clamping jaw, the handle is connected with the clamping arm of the clamping member, and the capillary tube is connected with the clamping jaw.

Further, the central axis of the capillary tube and the central axis of the clamping arm form a certain angle, which is greater than or equal to 0° and less than or equal to 90°.

Further, a reagent is stored in the capillary tube.

Further, the reagent is stored in the capillary channel of the capillary tube in the form of liquid, solid particles, powder or gel.

Test items of said test vessel are selected from glycosylated hemoglobin, C-reactive protein, homocysteine, cholesterol, glucose, high-density lipoprotein, low-density lipoprotein, urine microalbumin/creatinine ratio, glycosylated serum albumin, etc.

Further, the handle is provided with two clamping members, said clamping member includes an elastic clamping arm and a clamping jaw, the clamping jaws are connected with the clamping arms and located at the front ends of the clamping arms, and a collector is installed between the clamping jaws; or a clamping member with an insertion hole is disposed on the handle.

The collected reagent is stored in the collector in a non-liquid form. When in use, the collector is added to a reaction system together with the reagent stored therein. The non-liquid form is, for example, solid particles, powder or gel.

The reagent exists in the collector in a solid form such as powder. For example, a reagent solution is collected and stored in the collector in a dry state by a method such as freeze drying, drying or air drying. In a preferred embodiment, the reagent solution is dried within 5 min after being absorbed by the capillary tube.

The reagent stored in the collector contains an excipient, which can make the reagent solution have higher viscosity and adhere to the collector without falling off after drying. Said excipient is selected from one or a combination of polyols, carbohydrates, amino acids, inorganic salts or proteins and peptides. Specifically, for example, the excipient is selected from one or a combination of glycerol, sorbitol, mannitol, polyethylene glycol, dextran (dextran), sucrose, lactose, maltose, glucose, trehalose, sodium glutamate, lysine, alanine, arginine, phosphate, calcium carbonate, sodium acetate, mucopolysaccharide protein, casein, and bovine serum albumin.

The application type of said reagent can be controls, a calibrator, or a detection reagent for analyzing an analyte.

The controls or calibrator includes a preservation solution and a corresponding analyte. For example, the analyte is glycosylated hemoglobin (HbA1C), C-reactive protein (CRP), or homocysteine (HCY), etc. For example, the controls is used for CRP detection, including a preservation solution and C-reactive protein antigen. Said preservation solution includes sucrose, mannitol, BSA, trihydroxymethylaminomethane, etc.

Controls is selected from glycosylated hemoglobin controls, C-reactive protein controls or homocysteine controls, etc.; said calibrator is selected from glycosylated hemoglobin calibrator, C-reactive protein calibrator or homocysteine calibrator, etc.; and said detected analyte is selected from glycosylated hemoglobin, C-reactive protein or homocysteine, etc.

A third objective of the present invention is to provide a reagent storage method, including providing the sampling device described in the present invention, and storing the reagent in the collector of the sampling device.

A fourth objective of the present invention is to provide an application of a sampling device in preparation of controls and a preparation method. The method includes the following steps:

(1) providing the sampling device described in the present invention;

(2) providing controls reagent that needs to be stored;

(3) storing controls reagent in the collector; and (4) storing controls in the collector in a non-liquid form.

The dosage of said controls reagent is the dosage required for individual test.

Further, the said prepared controls is stored in a sealed container.

A method of using the sampling device described in the present invention, includes providing said sampling device; putting the collector containing the reagent into a reaction system; and allowing the reagent in the collector to enter the reaction system.

Further, the reagent contained in the collector is in a dry state, and the solution in the reaction system dissolves said dry reagent from the collector.

The present invention also provides a storage device for controls, which includes a handle and a collector for storing controls, said collector having a capillary function.

Said storage device for the controls may use the sampling device described in the present invention.

The present invention also provides the application of said sampling device in a test vessel. When in use, the reagent contained in the collector contacts with the reagent in the test vessel, and the detection reagent elutes and releases the reagent in the collector.

The present invention has the following beneficial effects:

The sampling device with the capillary function described in the present invention is capable of quickly, conveniently and quantitatively absorbing a required amount of a reagent or sample, is convenient to produce and manufacture, and can realize micro-quantitative sampling. Through cooperation of the sampling device with special medical apparatus and instruments, the purpose of precise sampling can be achieved. The capillary tube of the sampling device may have a certain angle, which can improve the eluting efficiency that the reagent in the test vessel washes out the sample in the capillary tube. When the solution is absorbed, the sampler prevents the outer wall of the capillary tube from being stained with more the sample in the sampling process.

The sampling device described in the present invention can also serve as the reagent storage device. The reagent stored in the sampling device can be in the form of dry powder. For example, the reagent stored in the sampling device contains an excipient with higher viscosity. After drying treatment, said reagent can be firmly attached inside the collector to avoid falling off. Compared with the reagent in the form of bottled solution, the controls in the dry form has a relatively longer period of validity and has lower temperature requirements for transportation and storage.

Compared with the freeze-dried powder controls contained in a large bottle for multiple servings, the sampling device described in the present invention has relatively small storage capacity, and can only store the amount of controls for individual use, thus realizing individual package of the detection reagent such as controls.

The sampling device with the detection reagent can also be directly put into a reaction container, and the liquid in the reaction container is used to elute the detection reagent so as to be directly used for measurement. Therefore, the reagent stored in the sampling device described in the present invention does not need to be redissolved in advance. This simplifies the operation steps of testing, and can also avoid the situation that waste is caused because the multiple-serving packaged reagent is not used up within the shelf life.

BRIEF DESCRIPTION OF THE DRAWINGS

FIG. 8A and FIG. 8B are respectively schematic diagrams of two designs that the capillary tube and the sampling device are integrally formed.

FIG. 9 is a schematic diagram of the sampling device inserted into a test vessel.

FIG. 10 is a schematic diagram showing that the reagent in the test vessel dissolves the sample in the capillary tube.

FIG. 11 is a schematic diagram of a sampling device with clamping members and capillary tubes increased.

FIG. 12A is a schematic diagram of a sampling device with the design of a clamping jaw changed.

FIG. 12B is a partially enlarged view of B in FIG. 5.

FIG. 13 is a diagram of relative positions of the clamping jaw, the capillary tube and a sample addition slot.

FIG. 14A is a front view of the sampler of Example 9.

FIG. 14B is a cross-section view along A-A of the sampler in FIG. 7A.

FIG. 14C is a partially enlarged view of C in FIG. 7B.

FIG. 15 is a schematic diagram showing that the capillary tube and the clamping arm of Example 9 have a certain angle.

DETAILED DESCRIPTION OF THE EMBODIMENTS

Figure 1:
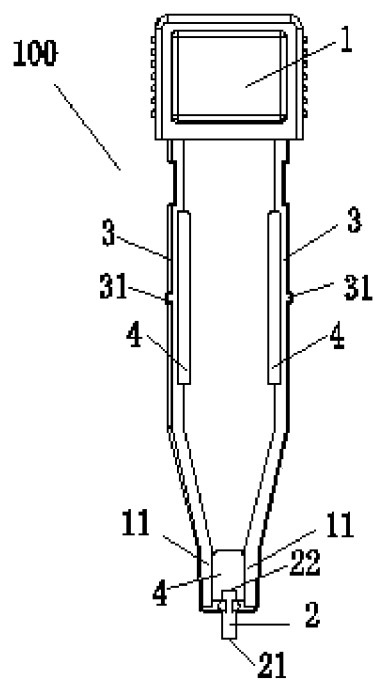
FIG. 1 is a schematic front view of a sampling device equipped with a capillary tube.
Figure 2:
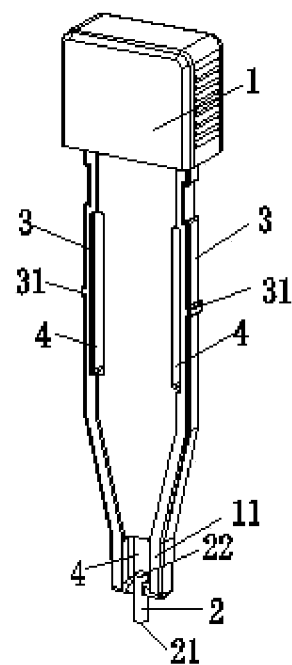
FIG. 2 is a schematic diagram of the sampling device in FIG. 1 rotated by a certain angle.
Figure 3:
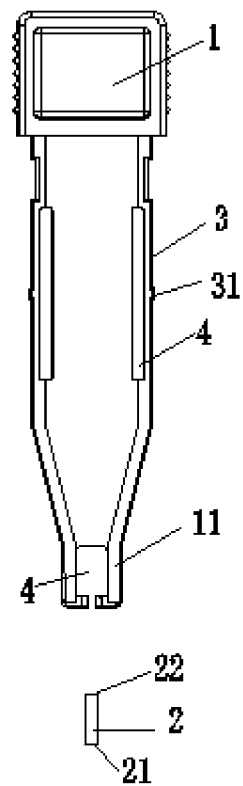
FIG. 3 is a schematic front view showing that the capillary tube and the sampling device are separated.
Figure 4:
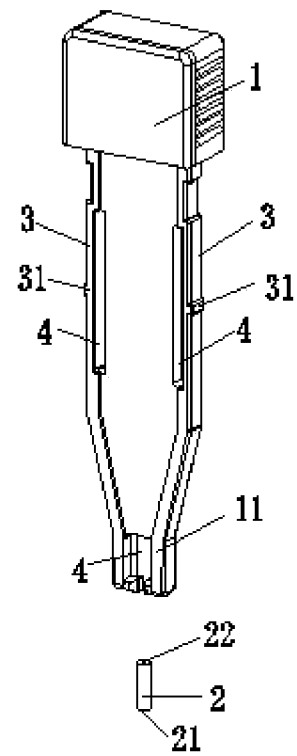
FIG. 4 is a schematic diagram of FIG. 3 rotated by a certain angle.
Figure 5:
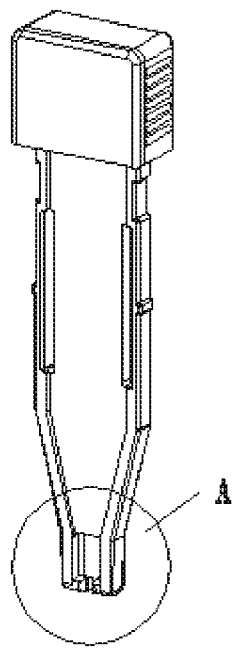
FIG. 5 is a schematic diagram of the sampling device not equipped with the capillary tube.

A sampling device includes a handle and a collector. The handle facilitates holding by an operator, the collector is used to absorb a reagent or sample, and store the reagent or sample in the collector. The collector has a capillary function and can automatically suck in a liquid. For example, the collector can absorb a reagent or sample quantitatively. Said collector may be of a tubular structure, such as a capillary tube. The handle and the collector may be connected to each other. They may also be separated from each other before use, and the handle and the collector are connected together when in use.

Said reagent is selected from controls, a calibrator, or a detection reagent, etc. The controls is used for quality control of a test system, in order to confirm the result accuracy of a test instrument and a test vessel. The calibrator is used to establish a standard curve of the test vessel, etc. The detection reagent is used to detect an analyte. For example, when detecting the content of glucose in a blood sample, said reagent for detecting the analyte includes glucose oxidoreductase; for example, when detecting the antigen in a urine sample, said reagent for detecting the analyte includes an antibody that is paired with the anti-specificity.

Said sample is, for example, blood, urine, saliva, sputum, feces, etc.

After drying, the liquid reagent absorbed by the sampling device can exist in the collector in the form of solid or gel, etc. In addition, the solid or gel reagent is not easy to fall off from the collector. The drying method may be freeze drying, drying or air drying, etc.

A certain amount of an excipient is added to said reagent. The excipient can make the reagent solution have higher viscosity. After the reagent collected in the collector is dried, the dried reagent can be attached inside the collector without falling off. The excipient may be selected from one or more of polyols, carbohydrates, amino acids, inorganic salts or proteins and peptides. Polyols are used as the excipient, such as glycerin, sorbitol, mannitol, polyethylene glycol, etc. Carbohydrates are used as the excipient, such as dextran (glucan), sucrose, lactose, maltose, glucose, etc. Amino acids are used as the excipient, such as sodium glutamate, lysine, alanine, etc. Inorganic salts are used as the excipient, such as phosphate, calcium carbonate, sodium acetate, etc. Proteins and peptides used as the excipient, such as mucopolysaccharide protein, casein, bovine serum albumin, etc.

When the reagent in the sampling device needs to be added to a test reaction system, there is no need to take out the reagent from the sampling device, and the collector can be directly added to the reaction system together with the reagent stored therein. For example, after said sampling device and a test vessel are assembled together, the reagent in the collector is in contact with other reagent in the test vessel, the reagent in the collector is dissolved by other reagent in the test vessel and enters the reaction system of the test vessel to participate in the reaction or play other roles. For another example, after the collector in the reaction system ruptures under the action of external force, the reagent stored in the collector is released into the reaction system.

A method for storing a reagent in the sampling device of the present invention includes: preparing the sampling device of the present invention, preparing the reagent to be stored, absorbing a quantitative amount of the reagent in the collector, and allowing the reagent to stably exist in the collector. For example, the prepared reagent is in a solution state, and the collector is a capillary tube. The operator holds the handle and causes the opening at the front end of the collector (for example the capillary tube) to contact the reagent, and utilizes the capillary function of the capillary tube to suck the solution reagent into the collector. The other embodiment, the handle of the sampling device is put on the support of a machine, and let the opening of the collector contact the reagent, the reagent automatically enters the collector under the capillary function. The capillary tube can absorb the solution quantitatively, so as to achieve the purpose of quantitatively storing the reagent. For example, when a device for storing controls for individual use is prepared, the amount of liquid absorbed by the capillary tube is the amount of the reagent used during individual test.

Example 1

As shown in FIGS. 1 to 24, the sampling device includes a handle 1 and a capillary tube 2, the capillary tube is installed at the front end of the handle. The shape, length and diameter of the capillary tube installed on the handle are determined, which can realize quantitative sample collection. According to different amounts of the sample to be stored, different specifications of capillary tubes can be used. For example, the specifications of the capillary tubes of different specifications such as 1 μL, 5 μL and 10 μL are shown in Table 1.

TABLE 1

| Specifications of the capillary tube | Inner diameter (mm) | Length (mm) |
| --- | --- | --- |
| 1 μL | 0.51 | 4 |
| 5 μL | 1.11 | 5 |
| 10 μL | 1.58 | 5 |
| 20 μL | 2.26 | 5 |

Figure 6:
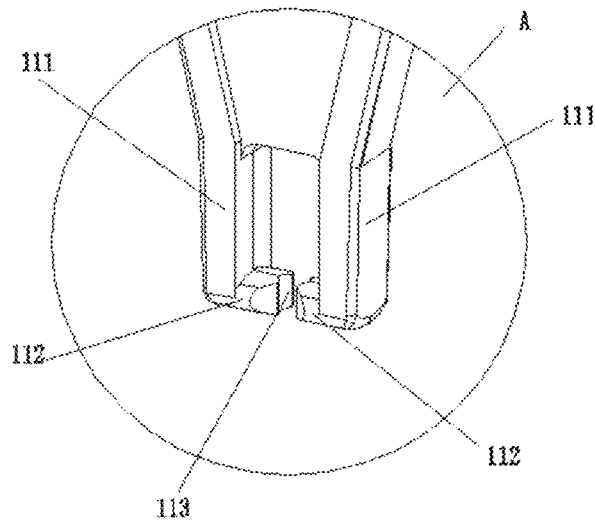
FIG. 6 is an enlarged view of A in FIG. 5.

The sampling device 100 as shown in FIGS. 1 to 6 has two clamping members 11 disposed opposite to each other at the front end of the handle. The clamping member 11 includes a clamping arm 111 and a clamping jaw 112, the clamping jaw is connected with the clamping arm and located at the front end of the clamping arm. The two clamping arms are elastic, the free ends of the two clamping arms can be opened appropriately, which facilitates assembly of the capillary tube 2 between the two clamping jaws. When the capillary tube is installed, the capillary tube is placed between the two clamping jaws, appropriately spreads the two clamping arms and then the resilience of the clamping arms is utilized to tightly clamp the capillary tube between the two clamping jaws. The outer diameter of the capillary tube is adaptive to the distance between the two clamping jaws, so as to facilitate tightly clamping the capillary tube by the clamping jaws. As shown in FIG. 6, the clamping surfaces 113 on the clamping jaws that contact the capillary tube are set to be in an arc shape. The radian of the arc shape 113 is consistent with the radian of the capillary tube, so as to increase the contact area between the clamping surfaces and the outer wall of the capillary tube, thereby enhancing the degree that the clamping jaws clamp the capillary tube. A capillary channel 20 is disposed in the capillary tube 2.

Figure 7:
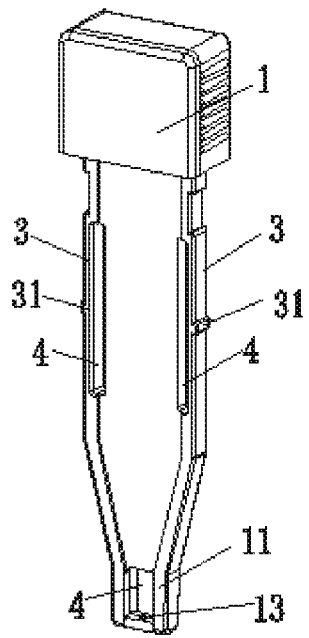
FIG. 7 is a schematic diagram of a sampling device, of which the clamping member is provided with an insertion hole.

The clamping arms of the clamping members also may not have elasticity. The capillary tube is fixed to the clamping members by a fixing method such as glue or welding. In the embodiment of the clamping arms having elasticity, the fixing method such as glue or welding can also be used to further ensure that the capillary tube will not fall off from the clamping arms. The sampling device 100 as shown in FIG. 7 has a clamping member 11 provided with an insertion hole at the front end of the handle, the capillary tube is inserted into the insertion hole. The fixing method such as glue or welding can be utilized to further ensure that the capillary tube will not fall off from the insertion hole.

Clamping the capillary tube by the clamping jaw is taken as an example to illustrate the method of utilizing glue to further fix the capillary tube to the clamping jaw. After the capillary tube is assembled to the clamping jaw of the handle, the position of the capillary tube in the clamping jaw is adjusted. The adjustment includes the length of the capillary tube extending from the clamping jaw. If the extension length is too long, it is not easy to wash out the sample or controls in the capillary tube. If the extension length is too short, it is not conducive to absorbing the sample or the controls. For example, a capacity of the capillary tube is 1 μL, the length of the capillary tube extending from the clamping jaw is about 2.2 mm. After adjustment of the position, UV-curing UV glue is dispensed by a glue dispenser or dispensed manually to the part where the capillary tube and the clamping jaw are connected. When glue is added, it is necessary to control the dripping amount of the glue. Too large dripping amount will block the opening of the capillary tube, while too small dripping amount will lead to the capillary tubes difficult to be fixed. Then, the sampling device after glue dispensing is placed on a UV curing machine for UV curing. The capillary tube on the sampling device after UV curing is fixed and will not slide downwards or eject upwards.

Figure 8A:
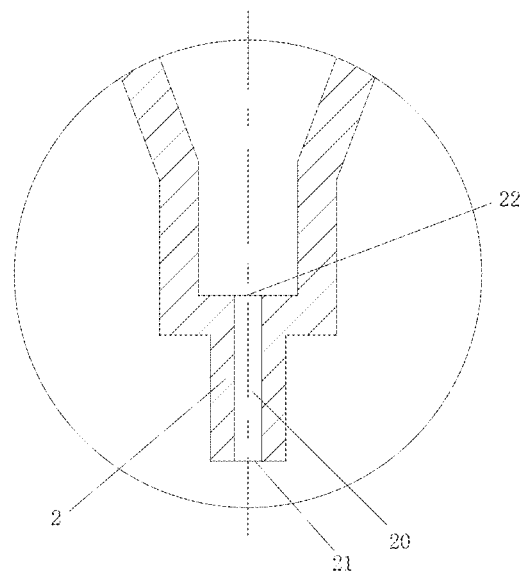

The handle and the capillary tube of the sampling device can be detachably connected as shown in FIGS. 1 to 4 or FIG. 7, for example, the capillary tube and the handle can be stored separately, the capillary tube is installed on the handle during use. The capillary tube can also be fixedly connected to the handle. As shown in FIG. 8A, the handle 1 of the sampling device and the capillary tube 2 at the front end of the handle are integrally formed. A capillary channel 20 is disposed in the capillary tube 2. The capillary channel 20 includes a lower end opening 21 and an upper end opening 22, and all the rest is closed. FIG. 8B is a modified design of FIG. 8A. The difference between FIG. 8B and FIG. 8A is that the capillary tube 2 in FIG. 8B includes two oppositely arranged protrusions 25 and 27. A gap 29 is disposed between the two protrusions. For example, the size of the gap is greater than or equal to 0.05 mm and less than or equal to 2.00 mm. and the gap 29 forms the capillary channel 20. In other words, the capillary channel 20 may also be the gap 29. For convenience, the capillary tube and the capillary structure in various examples are collectively referred to as the capillary structure in this patent, and the capillary tube is only a specific form of the capillary structure.

In order to prevent the handle of the sampling device from contacting the sample or the controls when the capillary tube is collecting the sample or the controls, the front end of the capillary tube installed on the handle protrudes out of the handle.

As shown in FIG. 1, the side of the handle of the sampling device is provided with an elastic member 3, the end of the elastic member is connected with the side wall of the handle, the middle of the elastic member is not connected with the side wall of the handle. There is a certain gap 4 between the elastic member 3 and the side of the handle. A protrusion 31 is disposed on the outer side of the elastic member. Such design can prevent the sampling device from slipping off the test vessel after being inserted into the test vessel. As shown in FIG. 9, when the sampling device is inserted into the sample addition slot 201 of the test vessel 200 with the aid of an external force, the inner wall of the sample addition slot squeezes the protrusions of the elastic members. Because the external force inserted is greater than the frictional force generated by squeezing, the sampling device can enters the sample addition slot, but after the external force is removed. Because the frictional force generated from the inner wall of the sample addition slot squeezes the protrusions on the elastic members is greater than the force in the gravity direction of the sampling device, the sampling device can not slide out of the test vessel even if the test vessel is turned over.

In order to rapidly eluting the sample sucked into the capillary tube by the liquid reagent, as shown in FIG. 1, a second opening 22 of the capillary tube is opposite to an injection port 21 of the capillary tube, there is a certain gap 4 between a second opening 22 and the handle, so that the second opening 22 of the capillary will not be covered by the wall surface of the handle. To further illustrate the eluting effect, as shown in FIGS. 9 to 10, due to the presence of the gap 4, the liquid 202 in the test vessel 200 can enter the capillary tube from the injection port 21, or enter the capillary from the second opening 22, so as to dissolve or elute the sample stored in the capillary tube respectively from both ends of the capillary tube.

The handle and capillary tube of the sampling device can be made of either different materials or the same material. For example, the material of the handle is medical plastic and the material of the capillary tube is a glass material.

The reagent is stored in the capillary channel 20 in the form of liquid, solid particles, powder or gel. If the reagent is liquid, in preferred embodiment, paraffin wax or an impermeable film seals the capillary channel after the reagent is stored in the capillary channel, so as to storage of the liquid reagent. In another embodiment, after the liquid reagent is added to the capillary channel, the moisture in the liquid reagent is evaporated to form a solid particle or powdered reagent, said solid particle or powdered reagent is attached to the inner wall of the capillary channel to storage.

Example 2 the Sampling Device in the Present Invention is Utilized to Prepare a Storage Device for Individual Controls The sampling device as shown in FIG. 1 is obtained, which equipped with a capillary tube with a capacity of 5 µL. A part of the control solutions contained in a large container is taken out with a pipette to a non-absorbent surface (such as a sealing film, a ziplock bag or a disposable drug change tray), the injection port 21 of the capillary tube contacts the surface of the control solutions, the control solutions will be quantitatively sucked into the capillary tube through the capillary effect of the capillary tube. The amount of the sucked control solutions is 5 µL, which can meet the usage amount for individual controls. The sampling device with the control solutions sucked in is put in a freeze dryer. After freeze drying, the control solutions forms freeze-dried powder in the capillary tube and then the storage device for the individual controls is obtained. Said sampling device carrying the freeze-dried powder is packaged in an aluminum foil bag and sealed for storage. Said storage device for the individual controls is more conducive to storage of the controls, and realizes the individual test requirement in the test process.

Said storage device for the individual controls is inserted into the test vessel 200 of patent application No. PCT/CN2016/087503 (publication number WO2017005122A) to complete the corresponding performance quality test of the test instrument. Said storage device for the individual controls may also be used in cooperation with a cuvette or other test device, for example, the storage device for the controls is inserted into the cuvette to release the quality controls in the storage device into the cuvette to complete the corresponding test.

Example 3 the Sampling Device in the Present Invention is Utilized to Prepare a Storage Device for Individual C-Reactive Protein Controls The C-reactive protein (CRP) controls includes a preservation solution and C-reactive protein antigen.

The method for preparing said C-reactive protein (CRP) controls includes preparing a certain amount of the preservation solution and adding a certain concentration of CRP antigen to the preservation solution, obtaining a CRP control solutions with the required concentration.

The components of the preservation solution include sugars, polyols, protein protectants, and biological buffers.

Specifically, in this example, said preservation solution includes 5% sugars, such as sucrose; 5% polyols, such as mannitol; 0.2% protein protective agents, such as BSA; 20 mM biological buffers, such as trihydroxymethylaminomethane (Tris).

A high-concentration CRP control solutions is prepared by adding 40 mg/L CRP antigen into the certain amount of said preservation solution. A low-concentration CRP control solutions is prepared by adding 10 mg/L CRP antigen into the certain amount of said preservation solution. Take a dosage of individual controls is 10 µL as an example, prepare the storage device of CRP individual controls. The sampling device in the present invention, with the sampling volume of the capillary tube being 10 µL (the capillary tube has been cured on the clamping member through glue dispensing), is used to suck the prepared CRP control solutions, the sampling device after absorption of the solution is completed performs a freeze drying operation in the freeze dryer to obtain the storage device for the CRP individual controls. The control solutions is adhered in the capillary tube on the storage device in the form of freeze-dried powder.

Falling-off experiment of the storage device for the individual controls: the prepared storage device for the individual controls is dropped from a height of 1 metre randomly for 10 times, or said storage device for the individual controls is held by a hand to vigorously hit the tabletop 10 times. It is not found in both cases that the freeze-dried powder in the capillary tube falls off from the capillary tube.

Example 4 Accuracy Experiment

Method: The storage device for the individual controls prepared according to the example 3 is randomly selected there are 4 high-concentration controls and 4 low-concentration controls respectively. These storage devices for the controls are inserted into the cuvette of the C-reactive protein test vessel from ACON (immunoturbidimetry) for dissolving, and complete the test in the specific protein analyzer P300 from ACON. All test results are within the quality control range of said controls.

The results are as shown in Table 2. It can be seen from the experimental data that the test results of the two levels of individual controls are all within the quality control ranges of the controls, that is, the accurate performances of the individual controls prepared according to Example 3 and stored in the storage device for the controls meet product requirements.

TABLE 2

| Accuracy results of Individual Controls Individual Controls | | |
|---|---|---|
| Level | Level 1 | Level 2 |
| Quality control range (mg/L) | 8.7.-16.1 | 34.8.-52.1 |
| Test result (mg/L) | 12.6 | 43.0 |
|  | 12.5 | 43.7 |
|  | 12.6 | 44.7 |
|  | 13.2 | 40.8 |
| Avg | 12.7 | 43.1 |
| SD | 0.3202 | 1.6543 |
| CV | 2.5% | 3.8% |
| Is it in the quality control range or not? | Yes | Yes |

Example 5 Precision Experiment

Method: 10 storage devices for each of the high-concentration and low-concentration controls are randomly selected. These storage devices for the controls are inserted into the cuvette of the C-reactive protein test vessel (immunoturbidimetry) for dissolving and are respectively tested on the specific protein analyzer P300. The average (Avg), standard deviation (SD) and coefficient of variation (CV) of 10 test results are calculated. The CV requirement of the controls is CV<10%.

The results are shown in Table 3. It can be seen from the experimental data that the CV results of the two levels of individual controls are all within 5%. There is no obvious intra-batch difference between the individual controls stored in the storage device for the controls of the present invention, which can meet product requirements.

TABLE 3

Precision results of individual controls
Individual controls

| Level | Level 1 | Level 2 |
|---|---|---|
| Test result (mg/L) | 12.6 | 43.0 |
|  | 12.5 | 43.7 |
|  | 12.6 | 40.8 |
|  | 13.2 | 44.7 |
|  | 11.9 | 46.1 |
|  | 12.4 | 42.6 |
|  | 13.2 | 41.4 |
|  | 12.1 | 42.0 |
|  | 12.3 | 43.7 |
|  | 12.3 | 46.5 |
| Avg | 12.5 | 43.5 |
| SD | 0.4228 | 1.8934 |
| CV | 3.4% | 4.4% |
| Does it meet the requirement? | Yes | Yes |

Example 6 Stability Experiments of Controls Stored in the Form of Bottled Liquid, Controls Stored in the Form of Bottled Freeze-Dried Powder, and Controls in the Storage Device for the Individual Controls of the Present Invention Experimental Method:

(1) 250 μL of each of the high-concentration control solutions and low-concentration control solutions prepared in Example 3 is taken and stored in a 2 ml brown freeze-dried glass bottle to obtain the controls in the form of bottled liquid.

(2) 250 μL of each of the high-concentration control solutions and low-concentration control solutions prepared in Example 3 is taken and stored in a 2 ml brown freeze-dried glass bottle, and is freeze-dried in a freeze dryer to obtain the controls in the form of bottled freeze-dried powder.

(3) A storage device for the individual controls is prepared according to the method of Example 3.

4 bottles of each of the high-concentration controls and low-concentration controls in the form of bottled liquid (referred to as bottled liquid controls), 4 bottles of each of the high-concentration controls and low-concentration controls in the form of bottled freeze-dried powder (referred to as bottled freeze-dried powder controls), and 12 storage devices for each of the high-concentration individual controls and low-concentration individual controls of the present invention (referred to as the individual controls) are taken out. They are stored in a 37° C. oven respectively. One bottled liquid controls, one bottled freeze-dried powder controls and three the individual controls are taken out at fixed intervals. These controls are used in the C-reactive protein test vessel (immunoturbidimetry) and are tested in a specific protein analyzer P300. The accelerated test results should be within the quality control ranges of the controls.

The results are as shown in Table 4. The stability of the bottled liquid controls is worst, none of their test results of stability is within the quality control ranges after they are placed at 37° C. for 7 days. The test results of the bottled freeze-dried powder and individual controls all within the quality control ranges after they place at 37° C. for 28 days.

The controls in three forms are all packaged using the control solutions prepared in Example 3. The quality control range of the individual controls is close to that of the bottled liquid and the quality control range of the bottled freeze-dried powder is relatively low. These results indicate that the loss of the controls is large after the bottled freeze-dried powder is redissolved. The individual controls does not have the redissolving problem which has good stability.

TABLE 4

Accelerated stability results of the controls at 37° C.

Analyte
CRP (mg/L)
Form of the controls

| | Individual controls | | Bottled freeze-dried powder controls | | Bottled liquid controls | |
|---|---|---|---|---|---|---|
| | Level 1 | Level 2 | Level 1 | Level 2 | Level 1 | Level 2 |
| Quality control range | 8.7-16.1 | 34.8-2.1 | 7.6-14.1 | 29.3-44.0 | 8.6-15.9 | 34.4-51.6 |
| 0 day | 12.6 | 43.0 | 10.9 | 36.6 | 12.5 | 44.6 |
| | 12.5 | 43.7 | 10.7 | 35.7 | 12.1 | 43.0 |
| | 12.6 | 44.7 | 10.7 | 36.0 | 11.8 | 42.6 |
| 7 days | 12.7 | 43.6 | 11.1 | 33.6 | 6 | 17.0 |
| | 12.1 | 44.4 | 11.0 | 35.5 | 6 | 17.8 |
| | 12.5 | 45.3 | 11.5 | 34.7 | 5.6 | 16.4 |
| 14 days | 12.9 | 44.0 | 10.7 | 36.2 | 1.9 | 8.1 |
| | 12.0 | 46.6 | 10.5 | 36.0 | 1.8 | 7.9 |
| | 13.1 | 43.2 | 10.4 | 34.5 | 1.9 | 8.1 |
| 21 days | 11.0 | 45.2 | 10.1 | 40.3 | — | — |
| | 12.3 | 44.1 | 10.6 | 37.2 | — | — |
| | 12.5 | 42.6 | 10.1 | 37.4 | — | — |
| 28 days | 11.9 | 44.7 | 10.5 | 35.1 | — | — |
| | 12.5 | 44.5 | 11.4 | 36.7 | — | — |
| | 12.1 | 43.6 | 11.0 | 35.9 | — | — |
| Is it in the quality control range or not? | Yes | Yes | Yes | Yes | No | No |

The performance comparison of the individual controls of the present invention, the bottled controls freeze-dried powder controls and the bottled solution controls liquid is shown in Table 5.

TABLE 5

| Storage type of the controls | Individual controls (the present invention) | Bottled freeze-dried powder controls | Bottled liquid controls |
|---|---|---|---|
| Period of validity | 1. No bottle opening problem, disposable; 2. long period of validity; 3. Storage and transportation have low requirement for temperature control | 1. short expiry time after bottle opening; 2. long period of validity; 3. Storage and transportation have low requirement for temperature control | 1. short expiry time after bottle opening; 2. short period of validity; 3. Storage and transportation have high requirement for temperature control |
| Redissolving | Available for direct use | Requiring redissolving for use | Available for direct use |
| Difference between bottles | None | Larger difference (mainly affected by redissolving) | Relatively small |
| Operation process | It can be directly put into the test vessel for testing, which simplifies the operation; controls of different forms and volumes can be produced according to users' needs, which has little effect on the accuracy of the results | 1. redissolving is required; 2. it is necessary to use a sample injector or pipette to absorb the controls and transfer the reagent to the test vessel. Human factors of the user operation have greater effect on the accuracy of the testing. | A sample injector or a pipette is used to absorb the controls and transfer the reagent to the test vessel. Human factors of the user operation have greater effect on the accuracy of the testing. |
| Cost | The total use cost is low, and customers can select to purchase corresponding devices according to the number of quality controls | The use cost is high, and waste will occur if the controls is not used up within the expiry time after bottle opening | The use cost is high, and waste will occur if the controls is not used up within the expiry time after bottle opening |

Example 7

As shown in FIG. 11, the sampling device 300 comprises a handle 301, clamping members 302 and capillary tubes 303. Compared with example 1, example 7 increases the numbers of the clamping members and the capillary tubes to achieve the use of one sampling device to collect different sampling volumes from 20 μL to 50 μL. Taking FIG. 11 as an example to illustrate a method of increasing the amount of the sample absorbed by the sampling device. As shown in FIG. 11, the number of the clamping members 302 of the sampling device is increased to three and the number of the capillary tubes 303 is increased to two, the volume of each capillary tube is 20 μL, so that the sampling amount of the sampling device is 40 μL.

Example 8

Changing the design of the clamping jaw 305 on the basis of Example 1, it can avoid touching the inner wall of the sample addition slot of the test vessel due to the inclination of the capillary tube when the sampling device is placed in the test vessel in non-completely vertical direction. The capillary tube touch the inner wall of the sample addition slot to let the sample in the capillary tube stays on said inner wall to affect the accuracy of the sample adding amount.

As shown in FIGS. 12A and 12B, a clamping member of a sampling device in this example comprises clamping arms 304 and clamping jaws 305. The capillary tube 303 is installed between the two clamping jaws 305. Seeing from the relative positions of the clamping arms 304, the clamping jaws 305, the capillary tube 303 and the sample addition slot 201 of the test vessel from the top view of FIG. 13. The capillary tube is protected by the clamping jaws in the middle. For example, the capillary tube is installed between the clamping jaws, and two ends of each clamping jaw protrude from the outer wall of the capillary tube. For example, on the projection surface where the sampling device is vertical to the horizontal plane, the outer wall of the capillary tube does not exceed the outer walls of the non-clamping surfaces of the clamping jaws.

When the sampling device is inserted into the sample addition slot, the clamping jaws may contact the sample addition slot and the capillary tube is protected in the middle dose not contact the sample addition slot. For example, when the sampling device is placed in the test vessel in non-completely vertical direction, the protruding clamping jaws will abut against the inner wall of the sample addition slot before the capillary tube, it reduces the angle that the sampling device can incline in the process of being put into the sample addition slot of the test vessel. It ensures that the capillary tube of the sampling device will not touch the inner wall of the sample addition slot and make the sample volume carried by the capillary tube too small when the sampling device is put into the test vessel.

Example 9

The sampling device 300 includes a handle 301, clamping members 302 and capillary tubes 303. The clamping members comprises clamping arms 304 and clamping jaws 305, the handle is connected with the clamping arms of the clamping members, and the capillary tube is placed between the clamping jaws. This example changes the installation angle of the capillary tube on the basis of Example 1, which can improve the situation that the clamping jaw and the outer wall of the capillary tube are stained with the sample to result in relatively more sampling amount in the sampling process. The capillary tube and the clamping arm have a certain angle, which facilitates absorbing the sample and improves the sample elution efficiency.

For example, the capillary tube is obliquely disposed. The capillary tube is not vertical to the horizontal plane, but at a certain angle with the same. For another example, the clamping arms are changed in shape and increased in length, the clamping surfaces 307 of the two clamping jaws 305 are inclined. The capillary tube installed on the inclined clamping surfaces is also in an inclined state, forming a certain angle with the clamping arms 304. The situation that the clamping jaws are stained with the sample in the sampling process to result in a relatively more sampling amount can be avoided, as seen in FIGS. 14A, 14B, 14C and 15. In another embodiment, the size of the clamping jaws 305 can be reduced.

As shown in FIGS. 14A, 14B, 14C and 15, the central axis 308 of the clamping surface 307 and the central axis 309 of the clamping arms form a certain angle (inclination angle), which is 10° in this example. The capillary tube installed in the clamping surfaces also has a certain inclination angle with the clamping arms. In this example, the included angle between the central axis of the capillary tube installed in the clamping surface and the central axis of the clamping arm is 10°.

Figure 16:
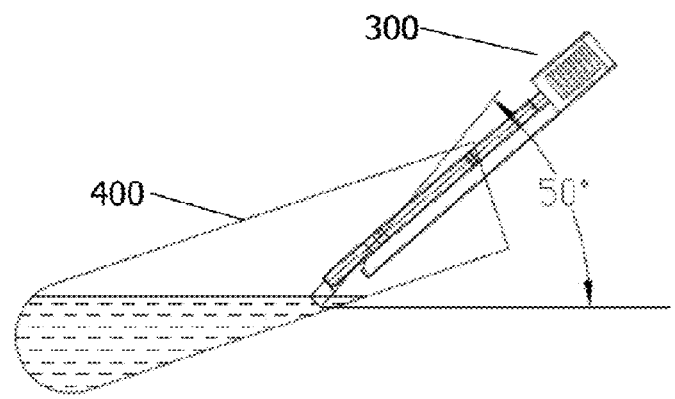
FIG. 16 is a schematic diagram of the sampler of Example 9 absorbing the sample.
Figure 17:
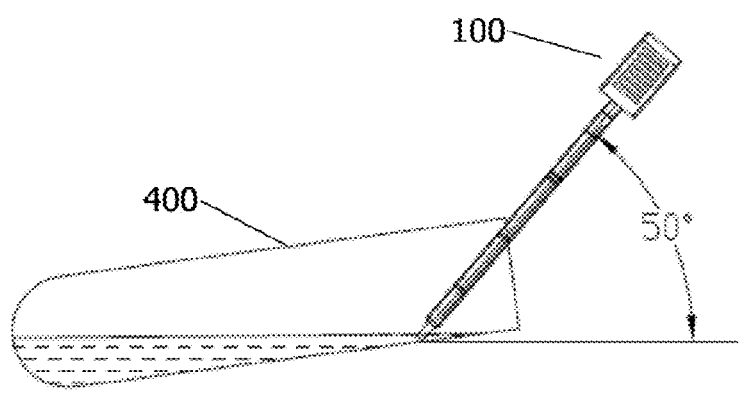
FIG. 17 is a schematic diagram of the sampler of Example 1 absorbing the sample.

The range of the included angle between the central axis of the capillary tube and the central axis of the clamping arms is less than or equal to 90°. According to the need of product design, any angle within this range is possible. Preferably, the included angle is from 5° to 60°, for example, 10°, 30°, etc. As shown in FIG. 16, the central axis of the capillary tube of the sampling device and the central axis of the clamping arms form a certain angle. When the sampling device is placed in a sample tube 400 to take the sample, the central axis of the capillary tube is at 50° with the horizontal plane. When the sampling device 300 puts into the sample tube 400 to suck the sample, the capillary tube can absorb the sample as long as the sample tube 400 inclines slightly. Parts other than the capillary tube will not be stained with the sample. As shown in FIG. 17, the sampling device with the central axis of the capillary tube parallel to the central axis of the clamping arms of example 1 is used to absorb sample in the sample tube. As shown in FIG. 17, when the sampling device is put into the sample tube 400 to absorb the sample, the central axis of the capillary tube is at 50° with the horizontal plane. In this situation, the sample can be obtained only when the sample tube needs to be inclined at a relatively large angle. Even the sample tube is almost parallel to the ground. When the sample tube is almost parallel to the ground, the sample is likely to spill from the sample tube.

Figures 18A, 18B:
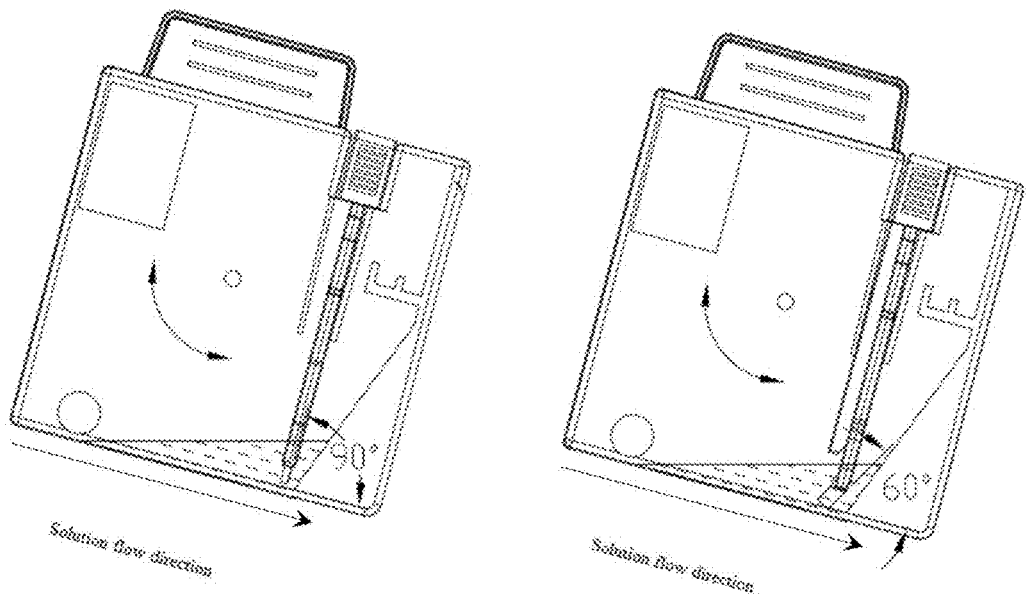
FIGS. 18A and 18B are respectively schematic diagrams of the included angle between the capillary tube of the sampler and the flow direction of the solution in the test vessel of Examples 1 and 9.

A certain angle formed between the capillary tube and the clamping arms is conductive to elution of the sample in the capillary tube. Taking 30° inclination between the central axis of the capillary tube and the central axis of the clamping arms as an example, the included angle between the solution direction and the capillary tube is changed from 90° to 60°, as shown in FIGS. 18A and 18B. When the sampling device is put into the test vessel for testing, the test vessel rotates and shakes at a certain angle in the test instrument and the solution in test vessel repeatedly washes the capillary tube. When the capillary tube is consistent with the flow direction of the solution, the solution will penetrate the capillary tube and the sample in the capillary tube easily to be eluted. When the capillary tube is at 90° with the flow direction of the solution and one end of the capillary tube is attached to the bottom of the test vessel, it is most difficult to elute the sample in the capillary tube. When the capillary tube has a certain angle with the clamping arms, the included angle between the solution washing direction and the capillary tube becomes smaller. So that the sample in the capillary tube is easier to elute and the sample elution time is also reduced.

The following test is performed for verification: collecting normal plasma and high-fat plasma and adding a certain amount of red dye to the plasmas respectively, so that the plasmas have certain absorption values at 530 nm wavelength when being dissolved in the solution. The sampling device is equipped with two kinds of capillary tube installation angles, 30° inclination and no inclination respectively. The said two sampling devices absorb normal plasma and high-fat plasma respectively and then put them into the test vessel containing a certain volume of reagent solution respectively. The absorption value at 530 nm wavelength is tested once every 4 times of shaking the test vessel. When the absorption value becomes stable, it indicates that the sample is completely eluted. The durations that the absorption value becomes stable are recorded. The results are recorded in table 6. The results show that compared with no inclination, when the capillary tube is inclined at 30°, the time for complete elution of the sample is significantly shortened.

TABLE 6

Sample elution time at different capillary tube installation angles
Time taken by complete elution of the sample

|  | Serial Number | No inclination of the capillary tube | | 30° inclination of the capillary tube | |
| --- | --- | --- | --- | --- | --- |
|  |  | Normal plasma | High-fat plasma | Normal plasma | High-fat plasma |
| Duration (s) | 1 | 12 | 24 | 6 | 6 |
|  | 2 | 12 | 24 | 6 | 6 |
|  | 3 | 12 | 30 | 6 | 6 |
|  | 4 | 18 | 24 | 6 | 6 |
|  | 5 | 12 | 24 | 6 | 6 |

Figure 24A:
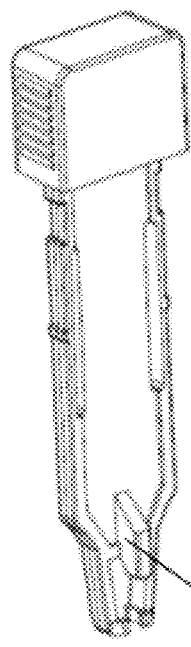
FIGS. 24A and 24B are schematic diagrams of other shapes of the limiting device.
Figure 24B:
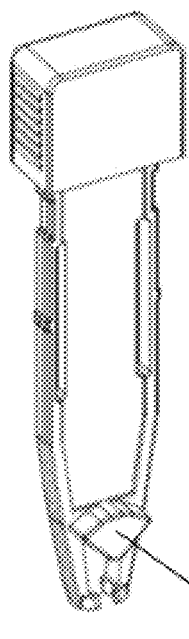

A limiting device is set on the sampling device. The sampling device with limiting device can be put into the test vessel only in one direction to limit the angle that the sampling device can incline in the process of being put into the sample addition slot of the test vessel. The limiting device can be set as a vertical rib or a polyhedral platform. Said limiting device can also be configured as the vertical rib as shown in FIG. 24A or the polyhedral platform as shown in FIG. 24B. The limiting device shown in FIG. 14A extends upward to the upper end of the handle on the basis of FIG. 24A.

Figure 19:
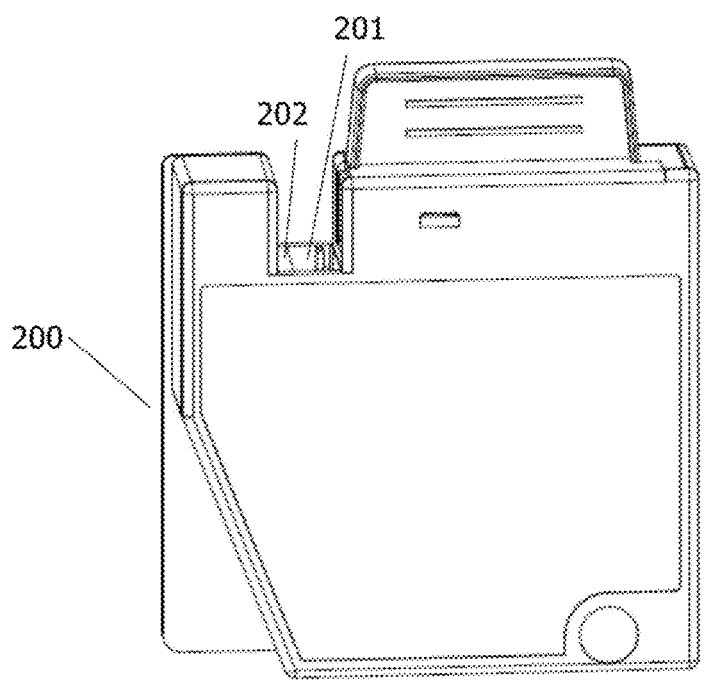
FIG. 19 is a front view of the test vessel.
Figure 20:
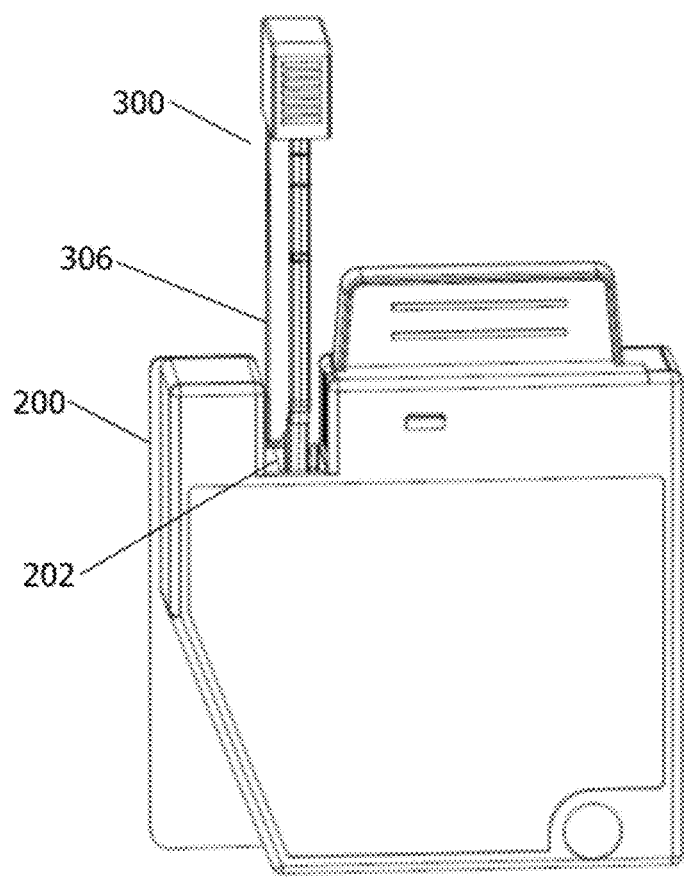
FIG. 20 is a schematic diagram showing that the limiting device of the sampler of Example 9 cannot be inserted into the test vessel in a reverse direction.
Figure 21:
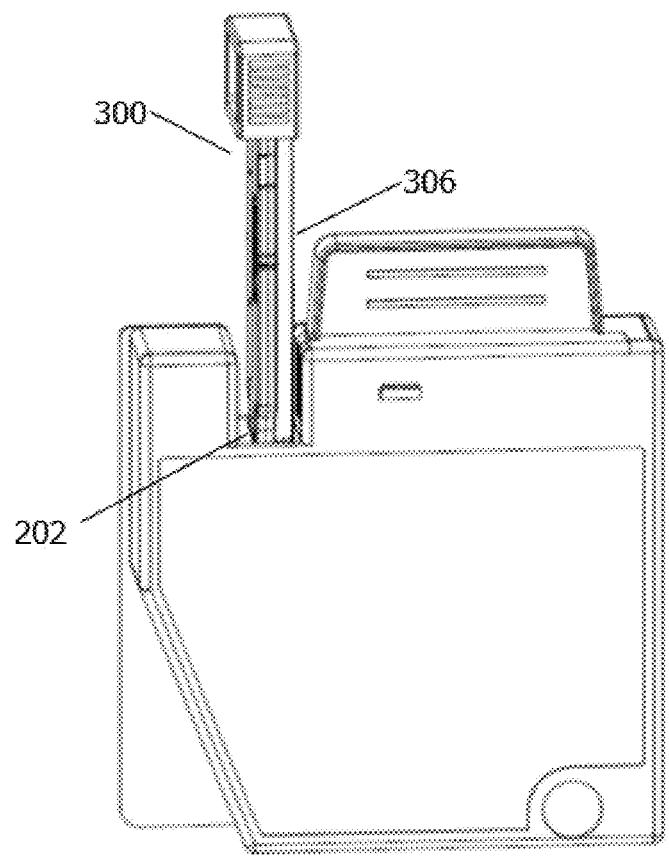
FIG. 21 is a schematic diagram showing that the limiting device of the sampler of Example 9 can be inserted into the test vessel in a forward direction.

A protuberance 202 is disposed on one side at the opening of the sample addition slot 201 of the test vessel as shown in FIG. 19. A limiting device 306 is added to the handle. The limiting device only allows the sampler 300 to be inserted into the test vessel 200 in the direction shown in FIG. 21. When the sampler is inserted into the test vessel in the direction shown in FIG. 20, the limiting device 306 will be blocked by the protuberance 202 of the sample addition slot 201.

Figures 22A, 22B:
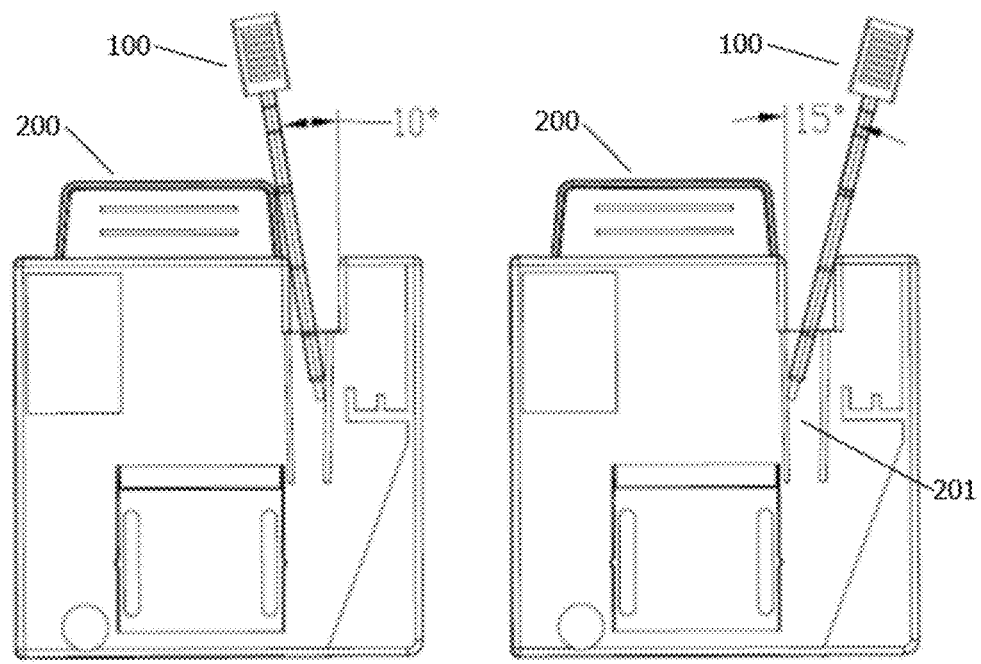
FIGS. 22A and 22B are schematic diagrams of the angle that the sampling device of Example 1 can incline in the sample addition slot.
Figure 23A:
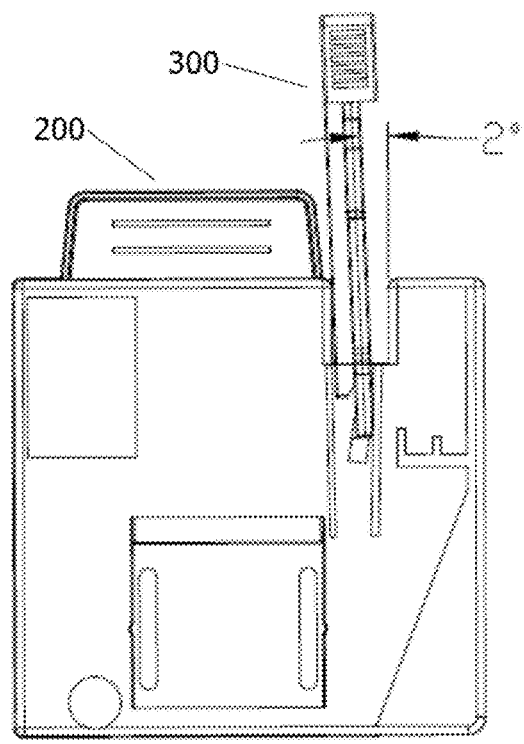
FIGS. 23A and 23B are schematic diagrams of the angle that the sampler of Example 9 can incline in the sample addition slot.
Figure 23B:
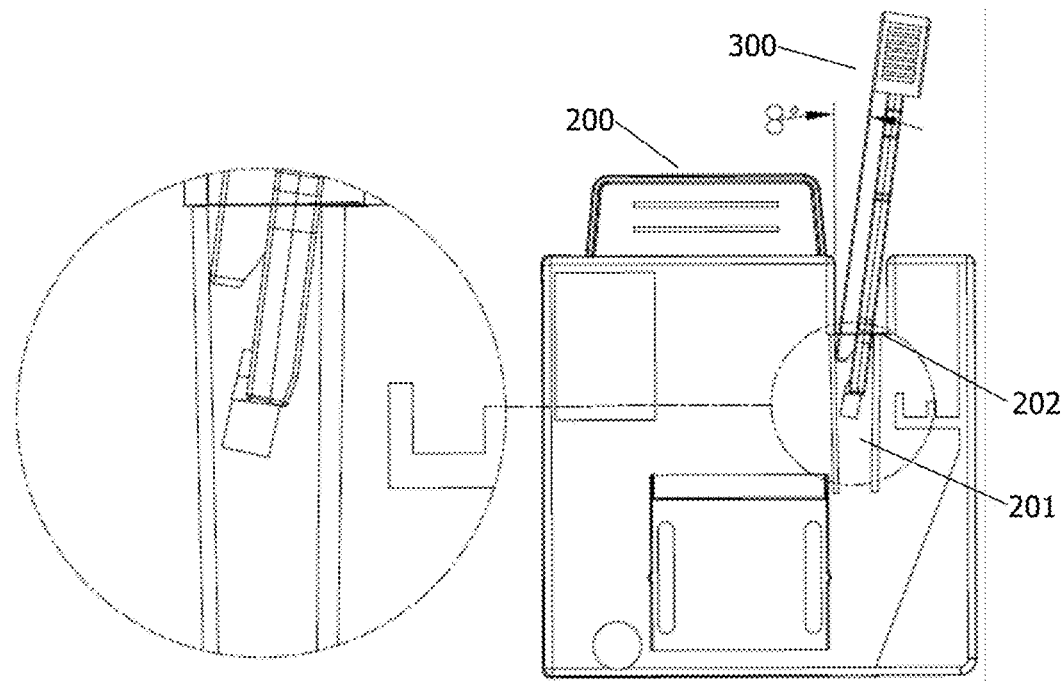

The limiting device reduces the angle that the sampler can incline in the process of being put into the test vessel. When the capillary tube is not obliquely disposed, the angles that it can incline in the sample addition slot are 10° in the left direction and 15° in the right direction respectively, as shown in FIGS. 22A and 22B. When the capillary tube is inclined at 10°, the angles that it can incline in the left and right directions are reduced to 2° and 8° respectively, as shown in FIGS. 23A and 23B. The inclined design of the capillary tube can ensure that the capillary tube will not scratch the inner wall of the sample addition slot in the process of putting the sampler into the test vessel to result in a relatively less amount of the sample.

The invention claimed is:

1. A sampling device, comprising:
a handle having an elongated planar surface and comprising a tapered end;
first and second clamping arms located at the tapered end of the handle, wherein each clamping arm comprises a clamping jaw, and wherein the first and second clamping arms are configured and arranged to provide a pair of opposed clamping jaws; and
a capillary tube comprising a first opening at a first end thereof, a second opening at a second end thereof, and a capillary channel extending from the first opening to the second opening;
wherein the capillary tube is obliquely disposed relative to the elongated planar surface and fixed at the tapered end of the handle between the pair of opposed clamping jaws by a clamping force applied to the capillary tube by an inclined clamping surface on each clamping jaw.

2. The sampling device according to claim 1, further comprising a test vessel comprising a test chamber and a sample addition slot, wherein the sample addition slot is configured and arranged to receive the sampling device by means of insertion such that the capillary tube is held within the test chamber and the handle is held within the sample addition slot by frictional force between an inner wall of the sample addition slot and the handle.

3. The sampling device according to claim 1, further comprising a test vessel comprising a test chamber and a sample addition slot, wherein the sample addition slot is configured and arranged to receive the sampling device by means of insertion the sampling device such that the capillary tube is held within the test chamber and the handle is held within the sample addition slot by frictional force between an inner wall of the sample addition slot and the handle.

4. The sampling device according to claim 1, wherein the inner diameter of the capillary tube is greater than or equal to 0.05 mm and less than or equal to 2.26 mm.

5. The sampling device according to claim 4, wherein the capacity of the capillary tube is greater than or equal to 0.1 µL and less than or equal to 20.0 µL.

6. The sampling device according to claim 4, wherein the capillary tube is obliquely disposed relative to the elongated planar surface at an angle of from 5° to 60°.

7. The sampling device according to claim 4, wherein a reagent is stored in the capillary channel of the capillary tube in the form of liquid, solid particles, powder or gel.

8. A sampling device according to claim 1, comprising:
a handle;
a capillary structure comprising two oppositely arranged protrusions and a gap disposed between the two protrusions forming a capillary channel,
wherein the size of the gap is greater than or equal to 0.05 mm and less than or equal to 2.00 mm,
the central axis of the capillary channel and the central axis of the handle is between 0° and 90°, and said capillary structure and said handle are manufactured integrally.

9. The sampling device according to claim 8, wherein a reagent is stored in said capillary channel.

10. The sampling device according to claim 9, wherein said reagent is stored in the capillary channel of the capillary tube in the form of liquid, solid particles, powder or gel.

11. A sampling device, comprising:
a handle having an elongated planar surface and comprising a tapered end;
first, second and third clamping members located at the tapered end of the handle;
a pair of opposed clamping members formed by the first and third clamping member and the second and third clamping members; and
first and second capillary tubes each comprising a first opening at a first end thereof, a second opening at a second end thereof, and a capillary channel extending from the first opening to the second opening;
wherein each capillary tube is obliquely disposed relative to the elongated planar surface and fixed at the tapered end of the handle between each pair of opposed clamping members by a clamping force applied to each capillary tube by an inclined clamping surface on each clamping member.

* * * * *